United States Patent [19]

Wahle et al.

[11] Patent Number: 4,880,898

[45] Date of Patent: Nov. 14, 1989

[54] WATER-SOLUBLE POLYCONDENSATES BASED ON FATTY ACIDS, DIALKANOLAMINE AND MALEIC ANHYDRIDE, A PROCESS FOR THEIR PRODUCTION, HYDRAULIC COMPOSITIONS CONTAINING THEM AND THEIR USE

[75] Inventors: Bernd Wahle, Kaarst; Hermann Anzinger; Horst Ziche, both of Duesseldorf; Erhard Schinski, Erkrath, all of Fed. Rep. of Germany

[73] Assignee: Henkel Kommanditgesellschaft auf Aktien, Duesseldorf, Fed. Rep. of Germany

[21] Appl. No.: 287,354

[22] Filed: Dec. 20, 1988

[30] Foreign Application Priority Data

Dec. 21, 1987 [DE] Fed. Rep. of Germany ....... 3743413

[51] Int. Cl.$^4$ .............................................. C08G 63/02
[52] U.S. Cl. ..................... 528/272; 528/274; 528/289; 528/295.5; 528/310; 528/317; 528/332; 528/339.5; 106/85; 106/100; 252/9; 252/50
[58] Field of Search ............ 528/272, 274, 289, 295.5, 528/296, 310, 317, 332, 339.5; 106/85, 100; 252/50, 9

[56] References Cited

U.S. PATENT DOCUMENTS 4,664,826  5/1987  Gutierrez et al. .................... 252/482
4,792,410  12/1988  Schwind et al. ....................... 252/38

Primary Examiner—John Kight
Assistant Examiner—Samuel A. Acquah
Attorney, Agent, or Firm—Ernest G. Szoke; Wayne C. Jaeschke; Real J. Grandmaison

[57] ABSTRACT

Water-soluble polycondensates of dialkanolamides, fatty acid diethylaminopolyglycolates and fatty acid diethyl ammonium alkyl polyglycolates, which are first reacted with maleic anhydride in a molar ratio of 1:0.5 to 1:2, followed by reaction of substantially all the olefinic double bonds in the $\alpha$-position to carboxyl groups with sulfites, are excellent plasticizers for hydraulic compositions.

19 Claims, No Drawings

WATER-SOLUBLE POLYCONDENSATES BASED ON FATTY ACIDS, DIALKANOLAMINE AND MALEIC ANHYDRIDE, A PROCESS FOR THEIR PRODUCTION, HYDRAULIC COMPOSITIONS CONTAINING THEM AND THEIR USE

BACKGROUND OF THE INVENTION

1. Field of the Invention:

This invention relates to water-soluble polycondensates based on $C_8$-$C_{22}$ fatty acids, dialkanolamine or alkoxylated derivatives thereof and maleic anhydride.

2. Description of the Invention:

Other than in the operating examples, or where otherwise indicated, all numbers expressing quantities of ingredients or reaction conditions used herein are to be understood as modified in all instances by the term "about".

The water-soluble polycondensates of this invention are essentially polyesters of fatty acid dialkanolamides or of fatty acid dialkanolaminopolyglycolates and maleic anhydride which have been converted into water-soluble compounds containing sulfonate groups by the addition of sulfites.

The water-soluble polycondensates according to the invention may be obtained by condensation of (a) dialkanolamides corresponding to formula I $$R-CO-N(C_kH_{2k}-OH)_2 \quad (I)$$

in which R—CO— is the residue of a $C_8$—$C_{22}$ fatty acid and k is the number 2 or 3, or fatty acid dialkanolaminopolyglycolates corresponding to formula II $$R-CO-(O-C_mH_{2m})_n-N(C_kH_{2k}-OH)_2 \quad (II)$$

in which R—CO— and k are as defined above, m is the number 2 or 3 and n is a number of 1 to 10, or dialkanolammoniumalkyl polyglycolates corresponding to formula III

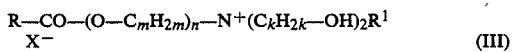

in which R—CO—, k, m and n are as defined above, $R^1$ is a $C_1$—$C_4$ alkyl group and X— is the residue of an alkylating agent, with maleic anhydride in a molar ratio of from 1:0.5 to 1:2, and more especially in a molar ratio of from 1:0.5 to 1:1.25, to form a condensation product having an acid value of up to 20, and (b) reaction of substantially all the olefinic double bonds of the condensation product in the ε-position to carboxyl groups with a sulfite.

The starting compounds of formulae I, II and III are known commercially available fatty acid derivatives. In principle, they are produced by reaction of the corresponding fatty acids or reactive derivatives thereof, such as acid chlorides, esters and the like with diethanolamine, di-n-propanolamine and diisopropanolamine, the corresponding dialkanolamines alkoxylated with up to 10 ethylene oxide or propylene oxide units (in random or block distribution) or with derivatives of the above-mentioned ethoxylated or propoxylated dialkanolamines quaternized with $C_1$-$C_4$ alkylating agents, such as methyl halide or dimethyl sulfate. The fatty acids used are of natural, in particular vegetable, animal or marine-animal origin or are synthetic fatty acids, more especially caprylic, capric, lauric, myristic, palmitic, stearic, arachic, behenic, lauroleic, myristoleic, palmitoleic, oleic, gadoleic or erucic acid, particularly technical mixtures thereof. The above-mentioned technical grade fatty acid mixtures or derivatives thereof may be obtained, for example, from soybean oil, sunflower oil, rapeseed oil, cottonseed oil, fish oil, coconut oil, palm kernel oil and palm oil and from tallows.

The starting compounds I, II and III described above are condensed with maleic anhydride in the customary manner. The condensation products contain the particularly reactive olefinic double bonds of the maleic anhydride in the α-position to carboxyl groups, onto which sulfites can be added in known manner (cf. J. Falbe (Ed.), Surfactants in Consumer Products, Springer-Verlag Heidelberg, 1987, pp. 82 to 83). Formally, this reaction gives salts of sulfosuccinic acid derivatives.

The sulfites used may be water-soluble salts of sulfurous acid, particularly sodium disulfite ($Na_2S_2O_5$) or sodium bisulfite ($NaHSO_3$), and also the corresponding lithium, sodium, potassium and ammonium salts.

In the case of the starting compounds I and II, polycondensates containing the structural element

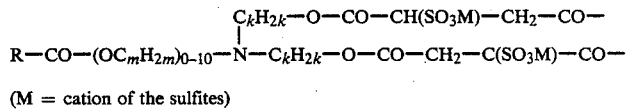

(M = cation of the sulfites)

are formed; the exact position of the $SO_3M$ groups, which may also be attached to the other C atom in the α-position to a CO function, cannot be stated. In the case of starting compound III, an analogous compound containing a quaternary nitrogen atom is formed.

In one advantageous embodiment of the invention, the residues R—CO— in formulae I, II and III above are residues of $C_{12}$-$C_{18}$ fatty acids or of technical mixtures thereof.

The present invention also relates to a process for the production of water-soluble polycondensates based on $C_8$-$C_{22}$ and more especially $C_{12}$-$C_{18}$ fatty acids, dialkanolamine or alkoxylated dialkanolamine and optionally quaternized derivatives thereof and maleic anhydride, which is characterized in that (a) dialkanolamides corresponding to formula I above, fatty acid dialkanolaminopolyglycolates corresponding to formula II above or fatty acid dialkanolammoniumalkyl polyglycolates corresponding to formula III above are reacted with maleic anhydride in molar ratios of 1:0.5 to 1:2 and more especially in molar ratios of 1:0.5 to 1:1.25 to form a condensation product having an acid value of at most 20, and (b) substantially all the olefinic double bonds of the condensation product in the α-position to carboxyl groups are reacted with sulfites.

The present invention also relates to hydraulic compositions based on cement, gypsum or lime which contain the polycondensates according to the invention as, in particular, plasticizing additives, optionally together with nonionic surfactants, preferably ethoxylated or propoxylated $C_{12}$–$C_{22}$ fatty alcohols or technical grade mixtures thereof.

Finally, the present invention relates to the use of the above-described water-soluble polycondensates either individually or in admixture, optionally together with nonionic surfactants, more especially ethoxylated or propoxylated $C_{12}$–$C_{22}$ fatty alcohols or technical grade mixtures thereof, as in particular plasticizing additives for hydraulic compositions based on cement, gypsum or lime which may be used as plasters, leveling compositions or the like.

The invention is illustrated by the following examples.

EXAMPLE 1

282.0 g (1 mol) of a commercially available lauric/myristic acid diethanolamide prepared by reaction of a lauric/myristic acid methyl ester (chain length distribution approx. 52 to 60% $C_{12}$, 19 to 23% $C_{14}$, approx. 10% $C_{16}$) with diethanolamine, were heated with 88.2 g (0.9 mol) of maleic anhydride in 100 ml of xylene to the boiling temperature (sump temperature 150° to 160° C.). After about 4.5 hours, about 90% of the theoretical quantity of water had separated off. By distilling off the xylene, the sump temperature was increased to 160° to 170° C. and the reaction was completed in 6 hours at that temperature. The acid value of the reaction mixture was less than 20 (a longer reaction time may have to be applied to achieve an acid value below 20). The solvent was then distilled off in vacuo (approx. 30 to 40 mbar); the resulting melt was left to cool to 90° to 100° C. and an 18% aqueous solution of 85.5 g (0.45 mol) of sodium disulfite ($Na_2S_2O_5$) was added over a period of 1.5 hours. After another 1.5 hours at 90° to 100° C., a light yellow, viscous liquid having a (calculated) solids content of 53% was obtained. The water was azeotropically removed by addition of toluene, and the resulting solid was size-reduced. A light yellow powder melting at 202° C. was obtained.

The production of water-soluble polycondensates according to the invention is described in Examples 2 to 11 below. Because the procedure is the same as in Example 1, only the reactants used are shown.

EXAMPLE 2

1 mol fatty acid diethanolamide according to Example 1
0.5 mol maleic anhydride
0.25 mol sodium disulfite

Example 3

1 mol fatty acid diethanolamide according to Example 1
1.25 mol maleic anhydride
0.625 mol sodium disulfite

EXAMPLE 4

1 mol fatty acid diethanolamide according to Example 1
mol maleic anhydride
1 mol sodium disulfite

EXAMPLE 5

1 mol fatty diethanolamide according to Example 1
0.95 mol maleic anhydride
0.475 mol sodium disulfite

EXAMPLE 6

1 mol fatty acid diethanolaminodiglycolate (from the fatty acid ester of Example 1 and diethanolamine containing 2 EO; EO=ethylene oxide units reacted)
1 mol maleic anhydride
0.5 mol sodium disulfite

EXAMPLE 7

1 mol fatty acid diethanolaminopolyglycolate (from the fatty acid ester of Example 1 and diethanolamine containing 3.6 EO)
1 mol maleic anhydride
0.5 mol sodium disulfite

EXAMPLE 8

1 mol fatty acid diethanolaminopolyglycolate (from a $C_{12/18}$ fatty acid methyl ester cut and diethanolamine containing 6 EO)
1 mol maleic anhydride
0.5 mol sodium disulfite

EXAMPLE 9

1 mol fatty acid diethylammonium methyl polyglycolate chloride (from the fatty acid ester of Example 1 and diethanolamine containing 3.6 EO quaternized with $CH_3Cl$)
1 mol maleic anhydride
0.5 mol sodium disulfite

EXAMPLE 10

1 mol coconut oil fatty acid diethanolamide
0.9 mol maleic anhydride
0.45 mol sodium disulfite

EXAMPLE 11

1 mol lauric acid diethanolamide
1 mol maleic anhydride
0.5 mol sodium disulfite The compounds were tested for their suitability as plasticizers for gypsum- or cement-containing compositions.

The tests with gypsum compositions were carried out by scattering the sample into the mixing water for 30 seconds and allowing it to drain for another 30 seconds. A Vicat ring (DIN 1168) was then filled and emptied by lifting. The slump factor (i.e. the diameter of the cake formed) was measured with a rule graduated in mm.

The results thus obtained for α-hemihydrate are shown in Table 1 and those for β-hemihydrate in Table 2. It was found that the plasticizing effect of the compounds according to the invention could be further enchanced by an addition of nonionic surfactants, for example ethoxylated $C_{12}$-$C_{22}$ fatty alcohols. The above-mentioned effect is further enhanced by dissolving the compounds according to the invention and optionally the nonionic surfactants beforehand in the mixing water (cf. tests no. 6 of Tables 1 and 2).

The tests to determine the plasticizing effect in cement-containing compositions are summarized in Table 3. In these tests, the organic substances were dry-mixed with cement and sand and the resulting mix introduced into the water. After stirring by hand for 30 seconds, a 50 mm diameter metal ring 45 mm in height with a volume of 88 $cm^3$ was filled to the brim. The ring was then lifted upwards; the slump factor was determined after 1 minute. In the case of cement, too, it was found that the plasticizing effect of the compounds according to the invention was improved by addition of the above-mentioned nonionic surfactants.

TABLE 1

| Test no. | 1 | 2 | 3 | 4 | 5 | 6* |
|---|---|---|---|---|---|---|
| α-hemihydrate (natural gypsum) | 250 | 250 | 250 | 250 | 250 | 250 |
| Example 1 | — | 1 | 1.25 | 1 | 1 | 0.5 |
| Cetostearyl alcohol containing 5 EO | — | — | — | 0.1 | — | 0.05 |
| Oleyl-cetyl alcohol containing 5 EO | — | — | — | — | 0.1 | — |
| Water | 100 | 100 | 100 | 100 | 100 | 100 |
| Slump factor (mm) | 160 | 210 | 250 | 300 | 240 | 230 |

*Organic substances previously dissolved in the mixing water. Quantities in g.
EO = ethylene oxide units.

TABLE 2

| Test no. | 1 | 2 | 3 | 4 | 5 | 6* |
|---|---|---|---|---|---|---|
| β-hemihydrate (natural gypsum) | 200 | 200 | 200 | 200 | 200 | 200 |
| Example 1 | — | 0.4 | 0.8 | 0.5 | 1.0 | 0.45 |
| Cetostearyl alcohol containing 50 EO | — | 0.05 | 0.1 | — | — | 0.05 |
| Water | 120 | 120 | 120 | 120 | 120 | 120 |
| Slump factor (mm) | 120 | 120 | 210 | 155 | 200 | 170 |

*Organic substances dissolved in the mixing water. Quantities in g.
EO = ethylene oxide units.

TABLE 3

| Test no. | 1 | 2 | 3 | 4 | 5 |
|---|---|---|---|---|---|
| Portland cement 35F | 70 | 70 | 70 | 70 | 70 |
| Quartz sand, 0–0.5 mm | 130 | 130 | 130 | 130 | 130 |
| Example 1 | — | 1.0 | 2.0 | 0.9 | 1.8 |
| Cetostearyl alcohol containing 50 EO | — | — | — | 0.1 | 0.2 |
| Water | 40 | 40 | 40 | 40 | 40 |
| Slump factor (mm) | No Flow | 133 | 137 | 176 | 177 |

EO = ethylene oxide units.

We claim:

1. A water-soluble polycondensate based on a $C_8$–$C_{22}$ fatty acid, a dialkanolamine or alkoxylated derivative thereof and maleic anhydride, obtained by condensation of (a) a dialkanolamide corresponding to formula I

    $$R\text{—CO—N}(C_kH_{2k}\text{—OH})_2 \qquad (I)$$

in which R—CO— is the residue of a $C_8$–$C_{22}$ fatty acid and k is the number 2 or 3, or a dialkanolaminopolyglycolate corresponding to formula II

    $$R\text{—CO—}(O\text{—}C_mH_{2m})_n\text{—N}(C_kH_{2k}\text{—OH})_2 \qquad (II)$$

in which R—CO— and k are as defined above, m is the number 2 or 3 and n is a number of 1 to 10, or a dialkanolammonium alkyl polyglycolate corresponding to formula III

    $$R\text{—CO—}(O\text{—}C_mH_{2m})_n\text{—N}^+C_kH_{2k}\text{-OH})_2R^1 \text{ X}^- \qquad (III)$$

in which

R—CO—, k, m and n are as defined above,
    $R^1$ is a $C_1$–$C_4$ alkyl group and
    X⁻ is the residue of an alkylating agent, with maleic anhydride in a molar ratio of from 1:0.5 to 1:2, to form a condensation product having an acid value of up to about 20, and (b) reaction of substantially all the olefinic double bonds of the condensation product in the α-position to carboxyl groups with a sulfite.

2. A water-soluble polycondensate as in claim 1 wherein said sulfite is selected from lithium, sodium, potassium or ammonium sulfite.

3. A water-soluble polycondensate as in claim 1 wherein said sulfite is sodium disulfite or sodium bisulfite.

4. A water-soluble polycondensate as in claim 1 wherein said group R—CO— in the compounds corresponding to formulae I, II and III is the residue of a $C_{12}$–$C_{18}$ fatty acid.

5. A process for the production of a water-soluble polycondensate based on a $C_8$–$C_{22}$ fatty acid, a dialkanolamine or alkoxylated derivative thereof and maleic anhydride, comprising condensing (a) a dialkanolamide corresponding to formula I

    $$R\text{—CO—N}(C_kH_{2k}\text{—OH})_2 \qquad (I)$$

in which R—CO— is the residue of a $C_8$–$C_{22}$ fatty acid and k is the number 2 or 3, or a dialkanolaminopolyglycolate corresponding to formula II

    $$R\text{—CO—}(O\text{—}C_mH_{2m})_n\text{—N}(C_kH_{2k}\text{—OH})_2 \qquad (II)$$

in which R—CO— and k are as defined above, m is the number 2 or 3 and n is a number of 1 to 10, or a dialkanolammonium alkyl polyglycolate corresponding to formula III

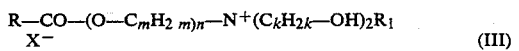
    $$R\text{—CO—}(O\text{—}C_mH_{2m})_n\text{—N}^+(C_kH_{2k}\text{—OH})_2R^1 \\ X^- \qquad (III)$$

in which

R—CO—, k, m and n are as defined above,
    $R^1$ is a $C_1$–$C_4$ alkyl group and
    X⁻ is the residue of an alkylating agent, with maleic anhydride in a molar ratio of from 1:0.5 to 1:2, to form a condensation product having an acid value of up to about 20, and (b) reacting substantially all of the olefinic double bonds of the condensation product in the α-position to carboxyl groups with a sulfite.

6. A process as in claim 5 wherein said sulfite is selected from lithium, sodium, potassium or ammonium sulfite.

7. A process as in claim 5 wherein said sulfite is sodium disulfite or sodium bisulfite.

8. A process as in claim 5 wherein said group R—CO— in the compounds corresponding to formulae I, II and III is the residue of a $C_{12}$–$C_{18}$ fatty acid.

9. A hydraulic composition comprising cement, gypsum or lime containing a water-soluble polycondensate based on a $C_8$–$C_{22}$ fatty acid, a dialkanolamine or alkoxylated derivative thereof and maleic anhydride, obtained by condensation of (a) a dialkanolamide corresponding to formula I

    $$R\text{—CO—N}(C_kH_{2k}\text{—OH})_2 \qquad (I)$$

in which R—CO— is the residue of a $C_8$-$C_{22}$ fatty acid and k is the number 2 or 3, or a dialkanolaminopolyglycolate corresponding to formula II $$R-CO-(O-C_mH_{2m})_n-N(C_kH_{2k}-OH)_2 \quad (II)$$

in which R—CO— and k are as defined above, m is the number 2 or 3 and n is a number of 1 to 10, or a dialkanolammonium alkyl polyglycolate corresponding to formula III $$R-CO-(O-C_mH_{2m})_n-N^+(C_kH_{2k}-OH)_2R^1 \quad X^- \quad (III)$$

in which
R—CO—, k, m and n are as defined above,
$R^1$ is a $C_1$-$C_4$ alkyl group and
$X^-$ is the residue of an alkylating agent with maleic anhydride in a molar ratio of from 1:0.5 to 1:2, to form a condensation product having an acid value of up to about 20, and (b) reaction of substantially all the olefinic double bonds of the condensation product in the α-position to carboxyl groups with a sulfite.

10. A hydraulic composition as in claim 9 wherein said sulfite is selected from lithium, sodium, potassium or ammonium sulfite.

11. A hydraulic composition as in claim 9 wherein said sulfite is sodium disulfite or sodium bisulfite.

12. A hydraulic composition as in claim 9 wherein said group R—CO—in the compounds corresponding to formulae I, II and III is the residue of a $C_{12}$-$C_{18}$ fatty acid.

13. A hydraulic composition as in claim 9 including a nonionic surfactant.

14. The process of plasticizing a hydraulic composition comprising cement, gypsum or lime, comprising adding thereto a water-soluble polycondensate based on a $C_8$-$C_{22}$ fatty acid, a dialkanolamine or alkoxylated derivative thereof and maleic anhydride obtained, by condensation of (a) a dialkanolamide corresponding to formula I $$R-CO-N(C_kH_{2k}-OH)_2 \quad (I)$$

in which R—CO— is the residue of a $C_8$-$C_{22}$ fatty acid and k is the number 2 or 3, or a dialkanolaminopolyglycolate corresponding to formula II $$R-CO-(O-C_mH_{2m})_n-N(C_kH_{2k}-OH)_2 \quad (II)$$

in which R—CO— and k are as defined above, m is the number 2 or 3 and n is a number of 1 to 10, or a dialkanolammonium alkyl polyglycolate corresponding to formula III $$R-CO-(O-C_mH_{2m})_n-N^+(C_kH_{2k}-OH)_2R^1 \quad X^- \quad (III)$$

in which
R—CO—, k, m and n are as defined above,
$R^1$ is a $C_1$-$C_4$ alkyl group and
$X^-$ is the residue of an alkylating agent, with maleic anhydride in a molar ratio of from 1:0.5 to 1:2, to form a condensation product having an acid value of up to about 20, and (b) reaction of substantially all the olefinic double bonds of the condensation product in the α-position to carboxyl groups with a sulfite.

15. The process as in claim 14 wherein said sulfite is selected from lithium, sodium, potassium or ammonium sulfite.

16. The process as in claim 14 wherein said sulfite is sodium disulfite or sodium bisulfite.

17. The process as in claim 14 wherein said group R—CO— in the compounds corresponding to formulae I, II and III is the residue of a $C_{12}$-$C_{18}$ fatty acid.

18. The process as in claim 14 including adding a nonionic surfactant to said hydraulic composition.

19. The process as in claim 18 wherein said nonionic surfactant comprises an ethoxylated or propoxylated fatty alcohol.

* * * * *

UNITED STATES PATENT AND TRADEMARK OFFICE
CERTIFICATE OF CORRECTION

PATENT NO. : 4,880,898

DATED : November 14, 1989

INVENTOR(S) : Bernd Wahle et al.

It is certified that error appears in the above-identified patent and that said Letters Patent is hereby corrected as shown below:

In Claim 9, at Col. 7, line 14, "$X^{+31}$" should read --$X^-$--.

Signed and Sealed this

Twenty-fifth Day of December, 1990

Attest:

HARRY F. MANBECK, JR.

Attesting Officer

Commissioner of Patents and Trademarks